United States Patent [19]
Seifrit, Jr.

[11] Patent Number: 5,327,797
[45] Date of Patent: Jul. 12, 1994

[54] VEHICLE PARKING BRAKE CABLE ACTUATING STRUCTURE

[75] Inventor: David R. Seifrit, Jr., Rochester Hills, Mich.

[73] Assignee: Chrysler Corporation, Highland Park, Mich.

[21] Appl. No.: 819,911

[22] Filed: Jan. 13, 1992

[51] Int. Cl.⁵ .......................... G05G 5/06; G05G 1/14
[52] U.S. Cl. ......................................... 74/512; 74/575
[58] Field of Search ................. 74/512, 575, 577 S, 74/578, 542

[56] References Cited

U.S. PATENT DOCUMENTS

| | | | |
|---|---|---|---|
| 2,995,047 | 8/1961 | Hinsey | 74/575 |
| 3,511,107 | 5/1970 | Yasiro | 74/575 |
| 4,441,380 | 4/1984 | Kawaguchi et al. | 74/512 |
| 4,872,368 | 10/1989 | Porter | 74/542 |
| 5,054,333 | 10/1991 | Scott et al. | 74/512 |

FOREIGN PATENT DOCUMENTS 937070  11/1973  Canada ................................ 74/575

*Primary Examiner*—Leslie A. Braun
*Assistant Examiner*—Khoi Q. Ta
*Attorney, Agent, or Firm*—Edward A. Craig

[57] ABSTRACT

A vehicle parking brake cable actuating structure is provided. The structure includes a support member having a manually operable brake lever pivotally mounted thereon. A brake cable is connected to the brake lever. The brake lever is pivotable between a cable released position and a cable tensioned position. A pawl and ratchet are provided for maintaining the brake lever in the cable tensioned position. The ratchet includes a single ratchet tooth to thereby result in only one possible cable tensioned positioned maintained by the ratchet.

2 Claims, 4 Drawing Sheets

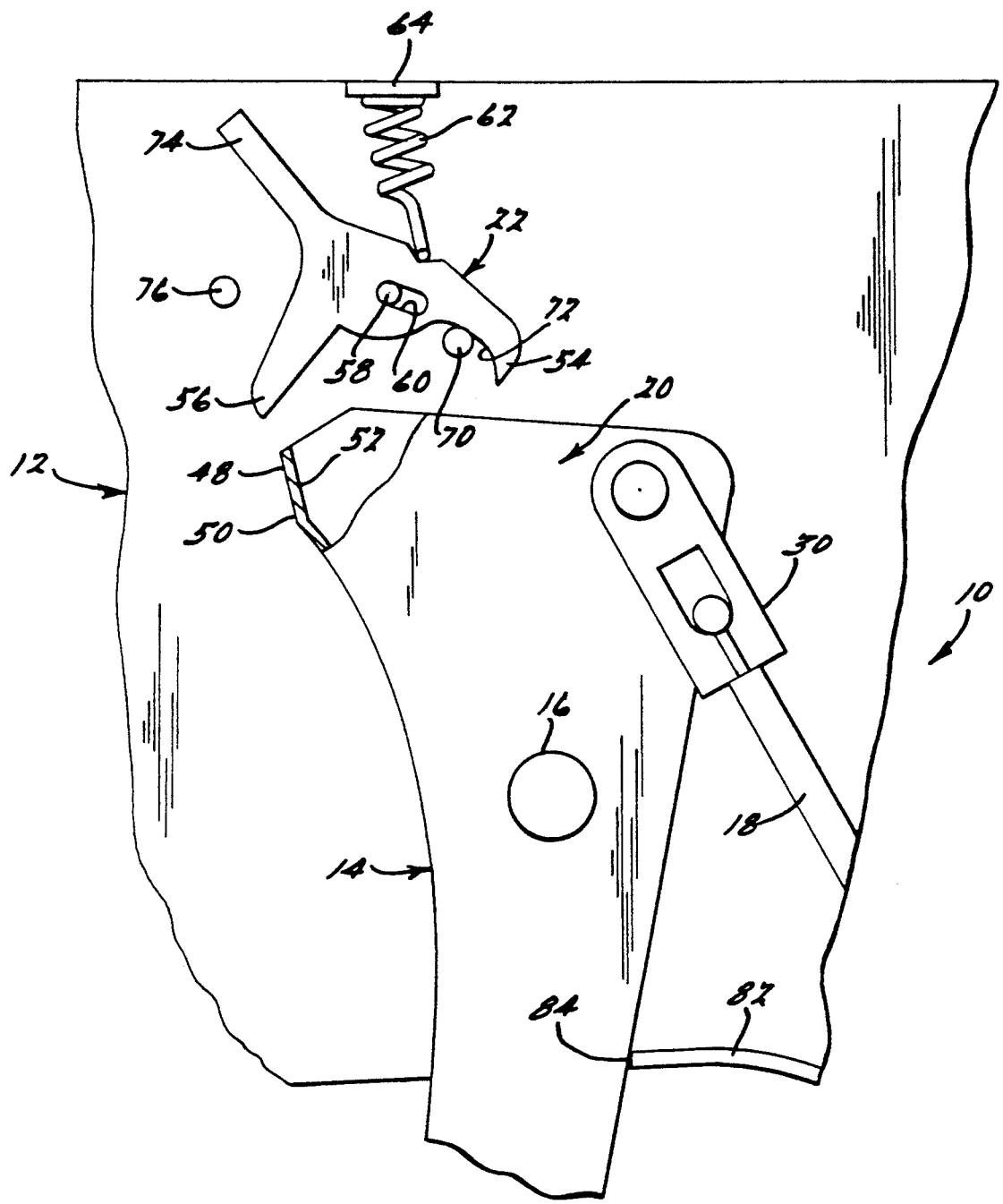

VEHICLE PARKING BRAKE CABLE ACTUATING STRUCTURE

BACKGROUND OF THE INVENTION

1. Field of the Invention

This invention relates to a vehicle parking brake cable actuating structure which includes a pivotal manually operable brake lever connected to a brake cable.

2. Description of Related Art

Modern vehicles commonly employ a foot operated parking brake lever assembly which is connected to a brake cable for actuating parking brake structure. One prevalent way of maintaining the brake lever in a cable tensioned position is to provide a ratchet and pawl mechanism engagable with the brake lever upon depression of the brake lever by the driver. One example of such a structure is illustrated in U.S. Pat. No. 4,872,368. This patent illustrates a typical ratchet structure which includes a plurality of teeth, each of which is engagable by a pawl mechanism.

Such structures have proven to be generally satisfactory in use. The present invention simplifies this general construction by providing a brake actuating structure which has only two positions of operation, one being with the brake applied and the other being with the brake unapplied. The purpose of the binary action is to simplify the operation of the parking brake for the user. As above mentioned, the typical parking brake structure has a ratchet with numerous teeth and various applied positions. The present parking brake structure offers only one applied position thereby reducing ambiguity and uncertainty of effectiveness of user effort.

The present parking brake structure also features foot operated release action. After the brake pedal is applied to the locking position, the brake can be released using a subsequent effort by the user's foot to release the locking feature and to cause the brake pedal to return to its unapplied (resting) position.

SUMMARY OF THE INVENTION

A vehicle parking brake cable actuating structure is provided. This structure includes a support member upon which a manually operable brake lever is pivotally mounted. A brake cable is connected to the brake lever. The brake lever is pivotable between a cable released position and a cable tensioned position. Spring means urge the brake lever to the cable released position.

Pawl and ratchet means are provided for maintaining the brake lever in the cable tensioned position. The pawl and ratchet means include a ratchet structure forming part of the brake lever. The ratchet means include a single ratchet tooth. A bifurcated pawl having first and second pawl tips is provided. The pawl is mounted on the support member by means of a pivot pin whereby the pawl is capable of pivotable movement relative to the support member between first and second ratchet tooth contacting positions in which the pawl tips are in operative engagement with opposite sides of the ratchet tooth, respectively.

Means are provided for connecting the pawl for lateral displacement between first and second end positions relative to the pivot pin. The connecting means include a slot provided in the pawl for receiving the pivot pin. Overcenter spring means are connected between the support member and the pawl. The overcenter spring means are alternately operable when the pawl is in the end positions for pivotally biasing the pawl in opposite directions relative to the pivot pin toward the first and second ratchet tooth contacting positions, respectively. The overcenter spring means normally has a first overcenter condition pivotally biasing the pawl in the first direction when the brake lever is in the cable release position and the pawl is in the first end position thereby to effect operative engagement between the first pawl tip and the ratchet tooth on one side thereof.

Cam means are provided which are operable solely when the pawl is in the first end and first ratchet tooth contacting positions and when the brake lever is initially pivoted in the cable tensioning direction for placing the first pawl tip in ratchet tooth contact and for laterally displacing the pawl toward its second end position whereby the overcenter spring means is actuated to a second overcenter condition to pivotally bias the pawl in the other direction toward its second ratchet tooth contacting position. The pawl, upon release of the brake lever in the cable tensioned position and with the pawl in the second end and second ratchet tooth contacting positions, being laterally displaced toward the first end position thereby returning the overcenter spring means to the first overcenter condition.

The pawl, when in the first end position and in the second ratchet tooth contacting position upon the application of torque to the pawl in the first direction, being pivoted by the overcenter spring means directly to the first ratchet tooth contacting position completely independent of the cam means.

The pawl has an arm extending in a direction away from the first and second pawl tips. A stop pin is mounted on the support member operable to contact the arm and limit pivotal movement of the pawl when the pawl is pivoted by the overcenter spring means out of contact with the cam means.

The brake lever has a portion extending away from its pivotal mount on the support member towards the pawl. This portion terminates in an open end. The open end includes a first wall section substantially parallel to and spaced from the support member. The first wall section has a forward marginal edge and a rearward marginal edge. The brake cable is connected to the forward marginal edge. A second wall section extends from the rearward marginal edge towards the support member. The second wall section defines the single ratchet tooth. The second wall section is substantially flat with the plane thereof being generally parallel to the surfaces of the first and second pawl tips which it contacts.

IN THE DRAWINGS

FIG. 7 is a view similar to FIG. 6 illustrating the pawl released after the brake lever has been pivoted further in the counterclockwise direction with reference to FIG. 6.

DETAILED DESCRIPTION OF A PREFERRED EMBODIMENT

Figure 1:
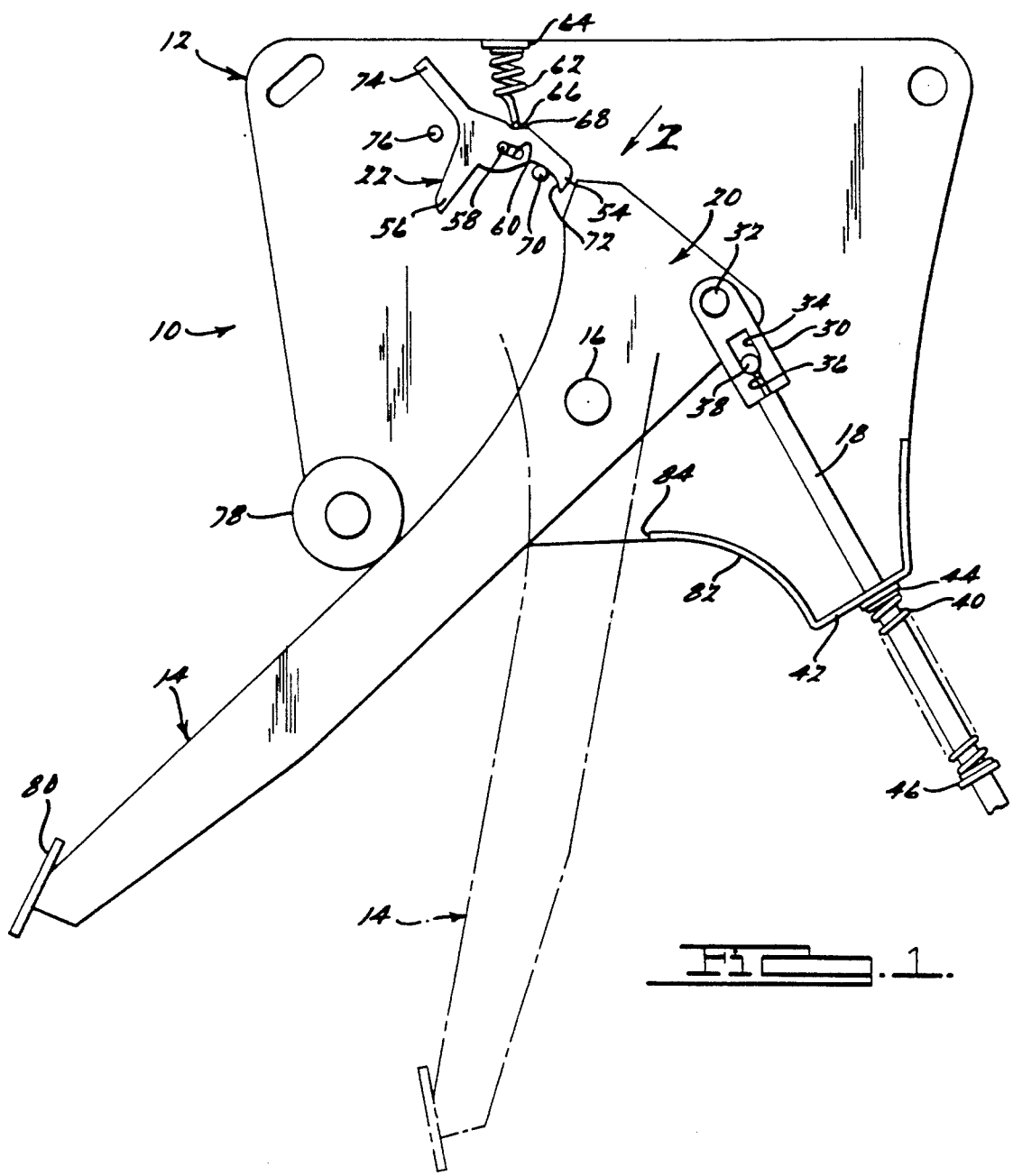
FIG. 1 is a front elevational view of one embodiment of the vehicle parking brake cable actuating structure of the present invention.
Figure 2:
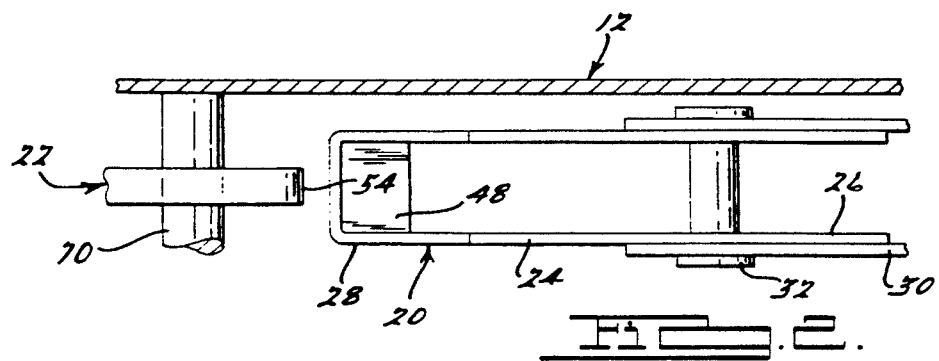
FIG. 2 is a view of the pawl and ratchet structure looking in the direction of arrow 2 of FIG. 1.

Referring to FIGS. 1 and 2, it will be noted that the vehicle parking brake cable actuating structure 10 includes a support member 12. The support member 12 is adapted for mounting on vehicle support structure (not shown). A manually operable brake lever 14 is pivotally mounted intermediate its ends on the support member 12 by means of a pivot pin 16. A brake cable 18 is connected to the brake lever 14. The brake lever 14 has an enlarged portion 20 extending away from its pivotal mount 16 on the support member 12 towards a pawl 22. As will be noted in FIG. 2, the portion 20 terminates in an open end. The open end is partially defined by a first wall section 24 which is substantially parallel to and spaced from the support member 12. The first wall section 24 has a forward marginal edge 26 and a rearward marginal edge 28. A cable mounting bracket 30 is pivotally connected to the forward marginal edge 26 by means of a pivot pin 32. The bracket 30 includes a slot having an enlarged portion 34 and a narrower portion 36. The brake cable 18 includes an enlarged ballshaped end 38 which is received in the enlarged slot portion 34, but cannot pass through the narrower portion 36, thus connecting the brake cable 18 to the brake lever 14. A coil spring 40 is provided on the brake cable 18 adjacent to support member wall section 42 and retained in place by means of fixed in place washers 44, 46. The spring means thus defined apply a torque and urge the brake lever 14 to the cable released position illustrated in solid lines in FIG. 1. The broken line showing of the brake lever 14 of FIG. 1 illustrates the brake lever in the cable tensioned position.

Pawl and ratchet means are provided for maintaining the brake lever 14 in the cable tensioned position. The structure includes ratchet means forming part of the brake lever 14. The ratchet means includes a single ratchet tooth 48 having opposed faces or surfaces 50, 52. The tooth 48 is defined by a second wall section of the brake lever portion 20 which is positioned at the rearward marginal edge 28 and extends towards the support member 12 as will be noted in FIGS. 2, 5, 6 and 7.

Figure 4:
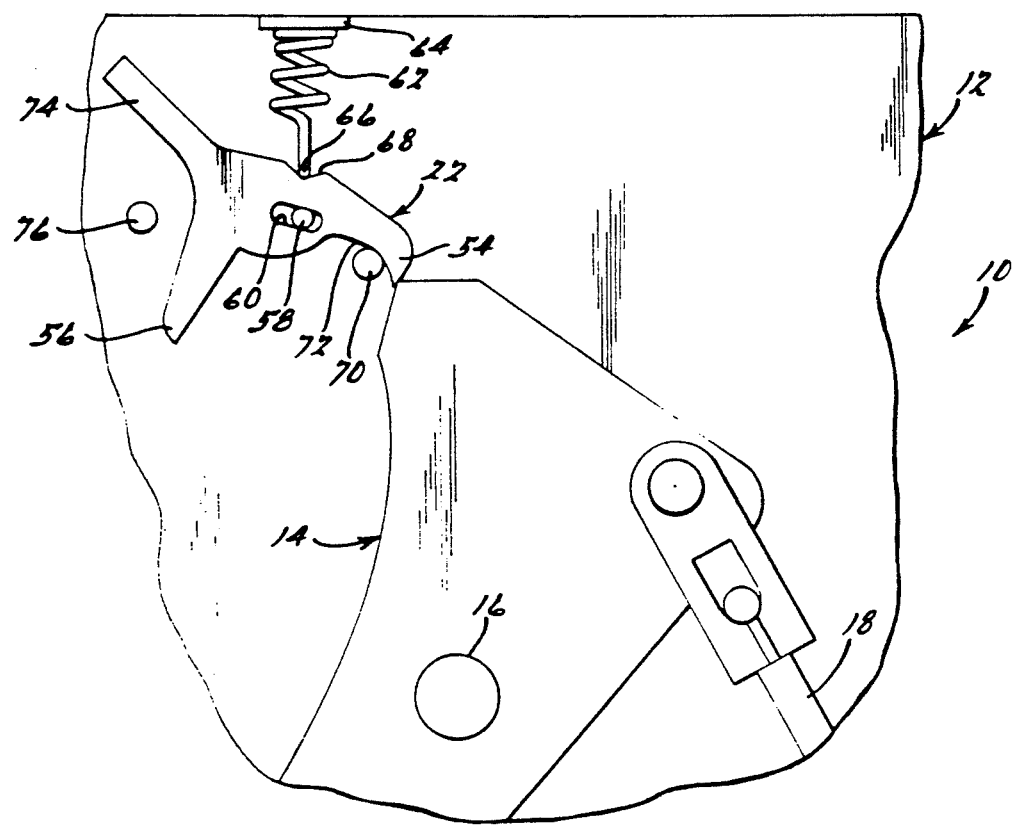
FIG. 4 is a view similar to FIG. 3 illustrating the brake lever pivoted further in the counterclockwise direction.
Figure 5:
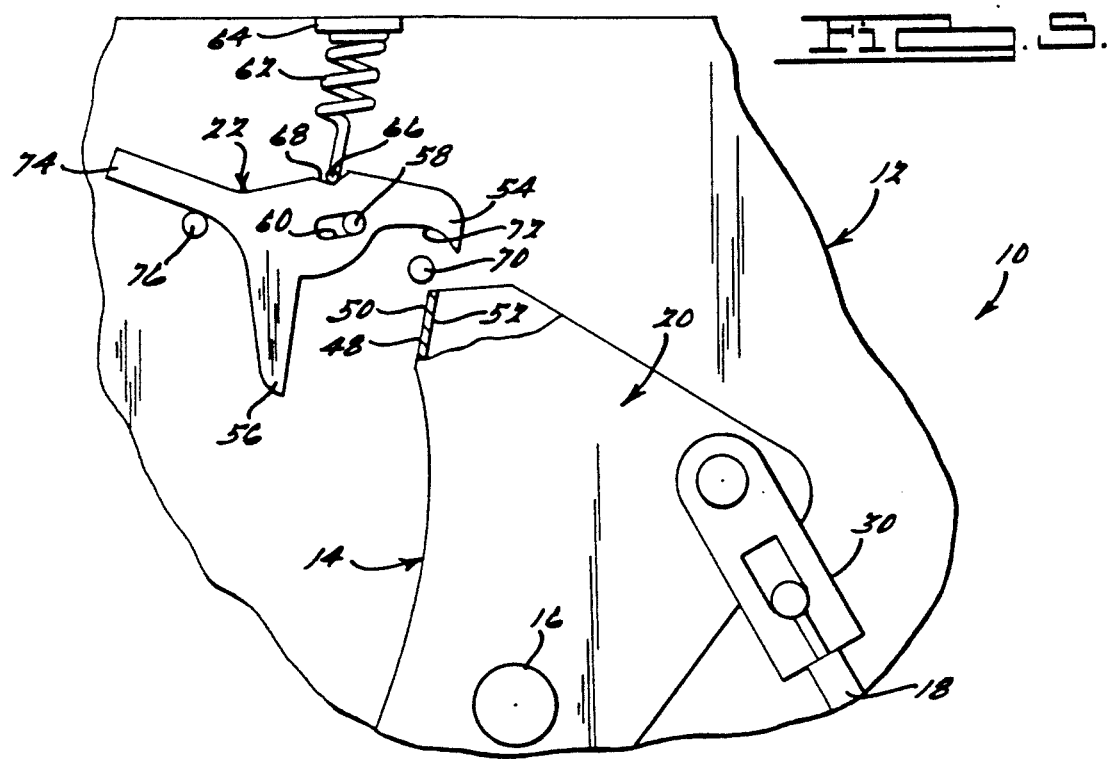
FIG. 5 is a view similar to FIG. 3 illustrating the pawl in a position where overcenter spring action has caused it to pivot in the counterclockwise direction.

The pawl 22 is bifurcated and has first and second pawl tips 54, 56. A pivot pin 58 is mounted on the support member 12 connecting the pawl 22 for pivotal movement relative to the support member 12 between first and second ratchet tooth contacting positions, the first position being illustrated in FIGS. 3 and 4 and the second position being illustrated in FIG. 6. In these positions, the pawl tips 54, 56 are in operative engagement with opposite surfaces 50, 52 of the ratchet tooth 48, respectively. Means are provided for connecting the pawl for lateral displacement between first and second end positions relative to the pivot pin 58. These connecting means include a slot 60 provided in the pawl 22 for receiving the pivot pin 58. The first end position is illustrated in FIG. 1 while the second end position is illustrated in FIG. 5.

Overcenter springs means are connected between the support member 12 and the pawl 22. The overcenter spring means includes a compression coil spring 62 which, at one end, is connected to a bracket 64 which extends from the support member 12. The other end of the spring 62 has a bent-over portion 66 which is received in a notch 68 provided in the pawl 22. The spring 62 exerts a downward force against the pawl 22 as viewed the various figures. The overcenter spring means is alternately operable when the pawl 22 is in its end positions for pivotally biasing the pawl 22 in opposite directions relative to the pivot pin 58 toward the first and second ratchet tooth contacting positions, respectively, as will be noted in FIGS. 3 and 6. The overcenter spring means normally has a first overcenter condition pivotally biasing the pawl 22 in the first direction when the brake lever 14 is in the cable released position and the pawl 22 is in the first end position as will be noted FIG. 1. This effects operative engagement between the first pawl tip 54 and the ratchet tooth 48 on one surface 50 thereof when the brake lever 14 is moved towards the cable tensioned position as will be noted in FIGS. 3 and 4.

Figure 3:
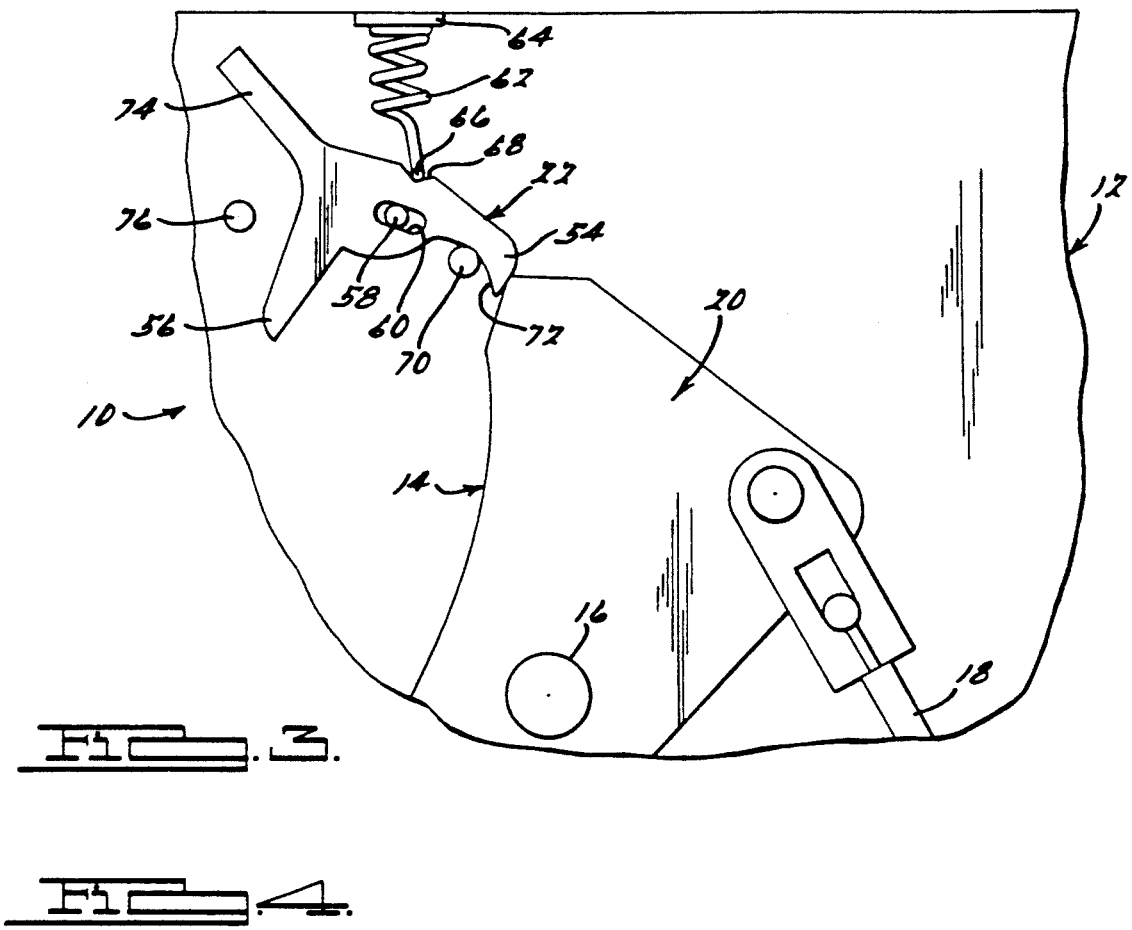
FIG. 3 is a view of a portion of FIG. 1 illustrating the condition of the brake lever and pawl after the brake lever has made actuating contact with a pawl tip.
Figure 6:
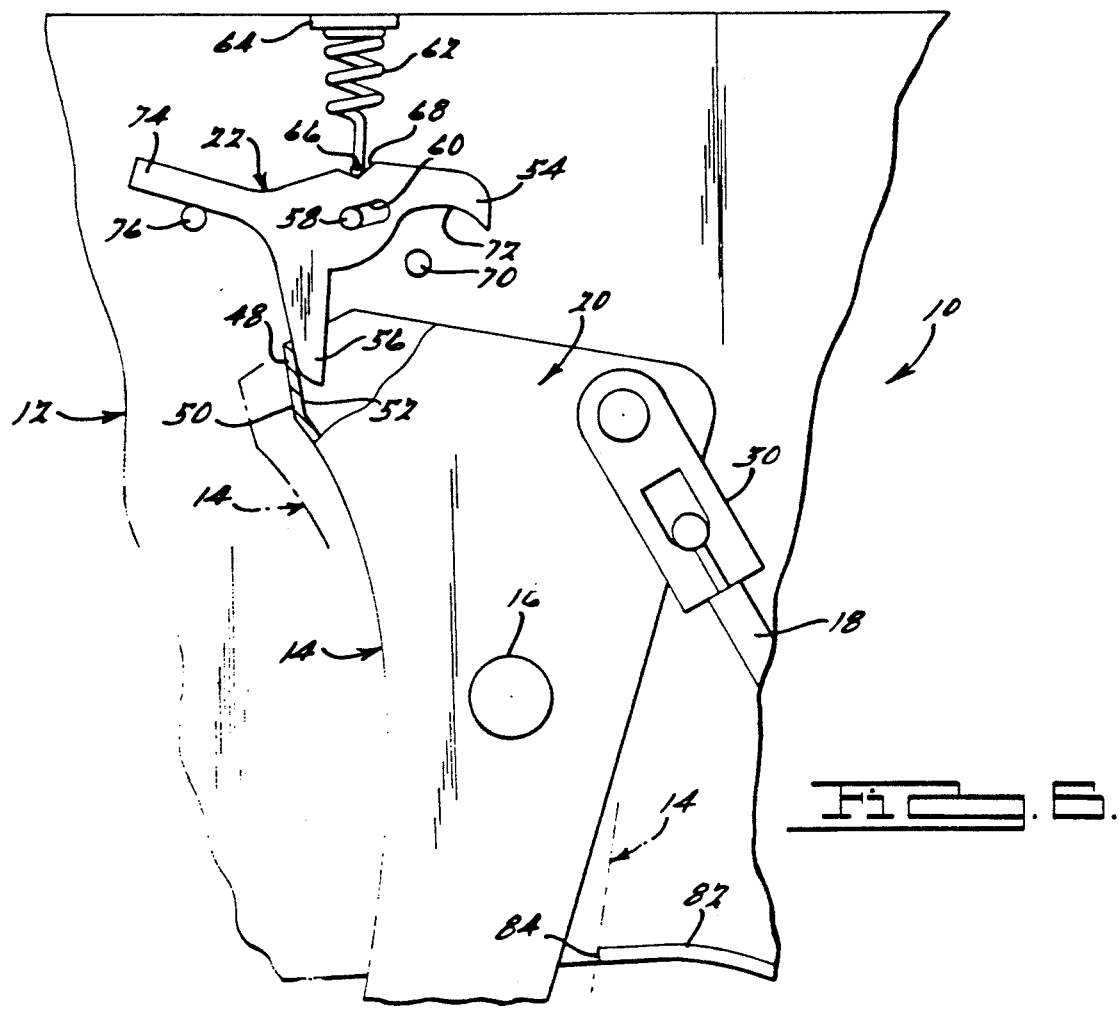
FIG. 6 is a view illustrating the brake lever ratchet tooth engaging a second pawl tip after the brake lever has been pivoted further in the counterclockwise direction with reference to FIG. 5.

Cam means comprising a cam pin 70 and cam surface 72 are provided. The cam means is operable solely when the pawl 22 is in the first end and first ratchet tooth contacting positions as illustrated in FIG. 1 and the brake lever 14 is pivoted to make ratchet tooth contact as shown in FIGS. 3 and 4. At other times, as shown in FIGS. 5 and 6, the cam pin 70 is out of contact with the cam surface 72. When the brake lever 14 is initially pivoted in the cable tensioning direction for placing the first pawl tip in ratchet tooth contact and for then laterally displacing the pawl toward its second end position whereby the overcenter spring means is actuated to a second overcenter condition to pivotally bias the pawl 22 in the other direction toward the second ratchet tooth contacting position illustrated in FIG. 6.

The pawl 22, upon release of the brake lever 14 in the cable tensioned position and with the pawl 22 in the second end and second ratchet tooth contacting positions as shown in FIG. 6 being laterally displaced toward the first end position, thereby returning the overcenter spring means to the first overcenter condition illustrated in FIG. 1. The pawl 22, when in the first end position and in the second ratchet tooth contacting position upon the application of torque to the pawl 22 in the first direction, being pivoted by the overcenter spring means directly to the first ratchet tooth contacting position shown in FIG. 6 completely independent from the cam means, it being appreciated that the cam pin 70 is at this time out of contact with the cam surface 72.

The pawl 22 has an arm 74, which extends in a direction away from the first and second pawl tips 54, 56. A stop pin 76 extends from the support member 12. The stop pin 76 is operable to contact the arm 74 and limit pivotal movement of the pawl 22 when the pawl 22 is pivoted by the overcenter spring means out of contact with the cam means as shown in FIGS. 5 and 6. This limits the position which the pawl 22 may take in the counterclockwise direction.

The following is a review of the operation of the vehicle parking brake cable actuating structure 10 taken sequentially in the order of presentation of the figures.

Referring first to FIG. 1, it will be noted that the brake lever 14 is in the cable released position, being located in such position by means of the force of the cable spring 40. A stop member 78 is provided on the support member 12 to limit clockwise movement of the brake lever 14. It should be noted that in this condition, the first pawl tip 54 is out of contact with the ratchet tooth 48, the cam pin 70 is in contact with the cam surface 72, the pawl 22 has been moved laterally to the first end position wherein the pin 58 is moved laterally to the left end of the slot 60 as viewed in FIG. 1, and the stop pin 76 is out of engagement with the arm 74. This is the normal at-rest position of the vehicle parking brake cable actuating structure.

When the brake lever 14 is depressed as a consequence of pressing against the foot pedal 80, the brake lever 14 will be pivoted in the counterclockwise direction whereby the ratchet tooth 48 will be moved towards the first pawl tip 54 to a point where the pawl tip 54 engages the surface 50 of the ratchet tooth 48. When this occurs, the pawl 22 will be moved laterally as a consequence of pressure of the ratchet tooth 48 against the first pawl tip 54 and the subsequent camming action of the cam pin 70 and cam surface 72. In the initial contacting position of the surface 50 and first pawl tip 54, the surface 50 is generally parallel to the surface of the first pawl tip 54 to provide good contacting relationship.

As the brake lever 14 is further pivoted, the pawl 22 continues to move laterally with the pin 58 moving closer to the opposite end of the slot 60 as shown in FIG. 4. Eventually, the pin 58 will reach the end of the slot thus accomplishing the second end position. At this point, the overcenter spring 62 will cause the pawl 22 to pivot in the counterclockwise position until the arm 74 contacts the stop pin 76 as shown in FIG. 5. At this point, the cam pin 70 is out of contact with the cam surface 72 and the pawl 22 is completely independent of the cam means.

Further pivoting of the brake lever 14 results in the ratchet tooth 48 contacting the second pawl tip 56. This contact will not cause lateral shifting of the pawl but rather the pawl will pivot about the pin 58 until such time as the tooth 48 passes thereby. The pawl 22 will, at that time, pivot in the counterclockwise direction as a consequence of the force of the overcenter spring 62 to the position illustrated in FIG. 6. As will be noted in FIG. 6, the support member 12 has a wall section 82 on the lower marginal edge thereof. The end 84 of wall section 82 acts as a stop for the brake lever 14. Thus, when the brake lever 14 is pivoted counterclockwise, it cannot go beyond the end 84. As shown in broken lines in FIG. 6, when the brake lever 14 impinges against the end 84, it is in the broken line position which permits the pawl 22 to pivot in the counterclockwise position thereby positioning the second pawl tip 56 as shown in solid lines. Upon release of the brake lever, it will be pivoted in the clockwise direction by the action of the spring 40 until the inner surface 52 of the ratchet tooth 48 contacts the second pawl tip 56 as shown in FIG. 6. It will be noted that the surface 52 is generally parallel to the surface of the second pawl tip 56 to result in good contact. When the tooth 48 is in contacting engagement with the second pawl tip 56, it causes the pawl 22 to shift laterally so that the pin 58 moves back to the opposite end of slot 60 to the first end position. As a consequence, when the brake lever 14 is again depressed, it will move to the position shown in dotted lines in FIG. 6. With the pawl 22 in the first end position, the overcenter spring 62 will again cause the pawl to pivot in the clockwise direction thereby releasing the second pawl tip 56 from the brake lever and, again, provide contact between the cam pin 70 and cam surface 72 as shown in FIG. 7. At this point, the brake lever 14 will move under the action of the spring 40 in the clockwise direction and return to the at-rest position illustrated in FIG. 1. When the tooth 48 passes the first pawl tip 54, it will contact it and cause the pawl to pivot in the counterclockwise direction, after which the overcenter spring 62 will cause the pawl 22 to pivot to the position illustrated in FIG. 1.

I claim:

1. A vehicle parking brake cable actuating structure comprising a support member, a manually operable brake lever pivotally mounted on the support member, a brake cable connected to the brake lever, the brake lever being pivotable between a cable released position and a cable tensioned position, spring means urging the brake lever to the cable released position, pawl and ratchet means for maintaining the brake lever in the cable tensioned position including ratchet means forming part of the brake lever, the ratchet means including a single ratchet tooth, a bifurcated pawl having first and second pawl tips, a pivot pin mounted on the support member connecting the pawl for pivotal movement relative to the support member between first and second ratchet tooth contacting positions in which the pawl tips are in operative engagement with opposite surfaces of the ratchet tooth, respectively, means connecting the pawl for lateral displacement between first and second end positions relative to the pivot pin, said connecting means including a slot provided in the pawl for receiving the pivot pin, overcenter spring means connected between the support member and the pawl, the overcenter spring means being alternately operable when the pawl is in said end positions for pivotally biasing the pawl in opposite directions relative to the pivot pin toward said first and second ratchet tooth contacting positions, respectively, the overcenter spring means normally having a first overcenter condition pivotally biasing the pawl in said first direction when the brake lever is in the cable released position and the pawl is in said first end position, thereby to effect operative engagement between the first pawl tip and the ratchet tooth on one surface thereof, cam means operable solely when the pawl is in the first end and first ratchet tooth contacting positions and when the brake lever is initially pivoted in the cable tensioning direction for placing the first pawl tip in ratchet tooth contact and for then laterally displacing the pawl toward its second end position whereby the overcenter spring means is activated to a second overcenter condition to pivotally bias the pawl in the other direction toward its second ratchet tooth contacting position, the pawl, upon release of the brake lever in the cable tensioning position and with the pawl in the second end and second ratchet tooth contacting positions being laterally displaced toward the first end position, thereby returning the overcenter spring means to the first overcenter condition, the pawl, when in the first end position and in the second ratchet tooth contacting position upon the application of torque to the pawl in the first direction, being pivoted by the overcenter spring means directly to the first ratchet tooth contacting position completely independent of the cam means, the pawl having an arm extending in a direction away from the first and second pawl tips, a stop pin mounted on the support member operable to contact the arm and limit pivotal movement of the pawl when the pawl is pivoted by the overcenter spring means out of contact with the cam means, the brake lever having a portion extending away from its pivotal terminating in an open end, said open end including a first wall section substantially parallel to and spaced from the support member, the first wall section having a forward marginal edge and a rearward marginal edge, the brake cable being connected to said forward marginal edge, a second wall section extending from the rearward marginal edge towards the support member, said second wall section defining said single ratchet tooth.

2. A vehicle parking brake cable actuating structure as defined in claim 1, wherein said second wall section defining the single ratchet tooth is substantially flat and generally parallel to the surfaces of the first and second pawl tips which it contacts.

* * * * *